Sept. 23, 1958    J. R. LLOYD ET AL    2,852,830
RIVER WEIGHT CLAMP
Filed Nov. 16, 1953

INVENTOR.
JOHN R. LLOYD &
NORRIS L. LLOYD
BY
J. D. Copeland Jr.
AGENT

United States Patent Office 2,852,830
Patented Sept. 23, 1958

2,852,830

RIVER WEIGHT CLAMP

John Robert Lloyd and Norris L. Lloyd, Houston, Tex.

Application November 16, 1953, Serial No. 392,323

1 Claim. (Cl. 24—249)

This invention relates generally to devices which are attached to pipe to increase the unit weight thereof, so that when pipe lines are laid across a body of water the increased pipe weight will cause the pipe line to sink and lay securely in the sand beneath the water.

The primary object of this invention is to provide a pipe weight clamp which may be attached securely to the pipe even through one side of the pipe remains in contact with the ground.

Another object of this invention is to provide a simple, economically constructed pipe weight clamp for the purpose intended which contains a minimum of parts.

A still further object is to provide a clamp of this type which may be securely fastened to a pipe by the tightening of only one nut.

And yet another object is to provide a pipe clamp having two movable jaws and means to draw the jaws together in a positive clamping manner without requiring any structure to encircle the pipe.

And still another object is to provide a pipe clamp which is so balanced that it may be lowered to the pipe in an open condition so that its jaws will automatically close in place the pipe when tightened.

These and other objects will become apparent from an examination of the following specification and drawing in which.

Figure 1:
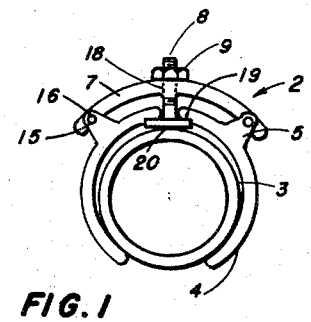
Fig. 1 represents an end view showing the pipe weight clamp of this invention installed on an open end pipe.
Figure 2:
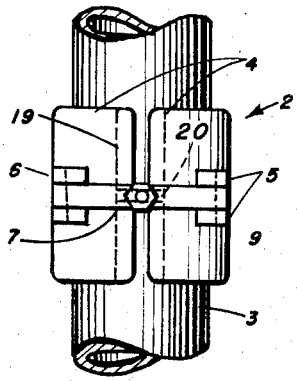
Fig. 2 is a top plan view of the clamp of Fig. 1.
Figure 3:
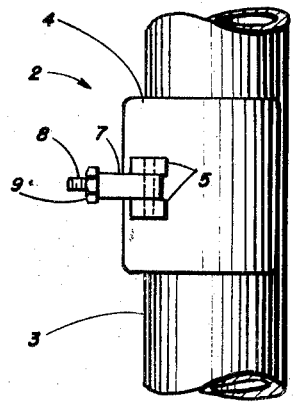
Fig. 3 is a side view of the device of Fig. 2.

Referring now more particularly to the characters of reference on the drawing, in Figs. 1-3 the pipe clamp is indicated generally at 2 and is shown to be engaging a section of pipe indicated at 3. Clamp 2 includes two jaws 4 which are curved to conform to the outline of the pipe 3. Upstanding ears 5 on the outer surface of jaws 4 combine to form a bifurcated bracket 6 on each jaw to receive tightening strap or yoke 7. Bolt 8 and nut 9 cooperate with jaws 4 and strap 7 to bind clamp 2 on pipe 3 in a manner to be more fully described hereinafter.

Ears 5 of each bracket 6 include aligned holes 15 through which pins 16 are inserted when slotted transverse holes 17 of strap 7 are also in their proper position of alignment. Vertical hole 18 through strap 7 permits relatively free passage of threaded bolt 8. The adjacent ends of jaws 4 include a longitudinal recess 19 of sufficient depth to accommodate the elongated head 20 of bolt 8. Head 20 has a narrow width sufficient to permit it to pass between the jaws 4 when turned in one direction; when head 20 is turned 90° from this direction its length spans the gap between jaws 4 and fits into recess 19.

Figure 4:
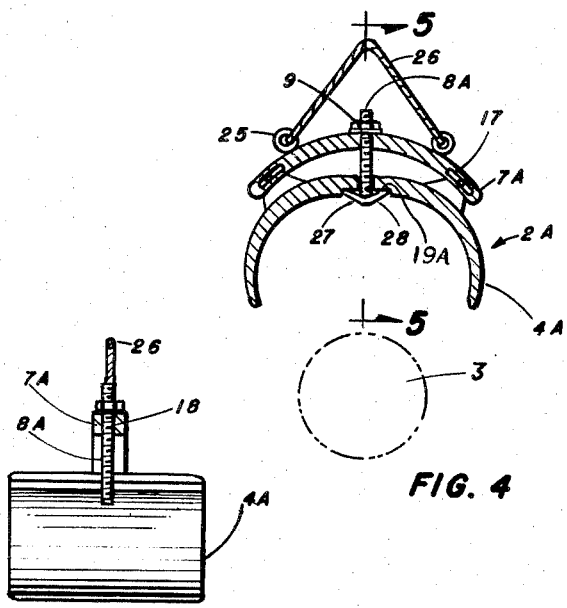
Fig. 4 is an end view in cross section of a modified embodiment of the pipe weight clamp of this invention.

In operation, the bolt 8 and nut 9 are in an untightened condition and jaws 4 are spread open as shown in Fig. 4 to surround a pipe. When jaws 4 are closed about pipe 3 as shown in Fig. 1, head 20 of bolt 8 is slipped between the jaws and turned to engage recess 19, and then nut 9 is tightened which effectively applies an upward force to the upper ends of the jaws and causes the lower section of the jaws to bind against the pipe 3. However, since nut 9 bears downward against strap 7, the upper ends of jaws 4 are prevented from moving, and the entire clamp 2 rigidly engages the pipe. Since jaws 4 may be constructed of heavy material such as cast iron, and may be relatively large and thick, the amount of weight effectively added to a length of pipe may be predetermined over a wide range by merely varying the dimensions of clamp 2.

Figure 5:
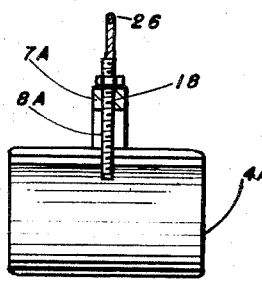
Fig. 5 is a side view in cross section of the embodiment of Fig. 4.

A modified embodiment 2-A of this invention is shown in Figs. 5 and 4. The structural parts of clamp 2-A correspond to those of clamp 2 with the exception of: jaws 4A which are heavier at their top end so as to assume an open or spread position when being lowered over a pipe; strap 7A includes eyelets 25 to permit a cable sling 26 to be attached to clamp 2A so that the clamp may be lowered by a crane when the weight requires; bolt 8A includes a toggle head 27 having spring loaded arms 28 so that head 27 may be forced through the gap between jaws 4A and arms 28 will expand to engage recess 19A. As nut 9 is tightened about bolt 8A, arms 28 move up and jaws 4A close about pipe 3 until the jaws 4A and pipe are locked in close proximity, and remain clamped when lowered to the bottom of a lake or river.

In some instances it may be necessary for a diver to go under water and attach this clamp to a pipe line already on the river bottom. In this case it would be extremely difficult to raise the pipe off the river bottom and pass a strap under the pipe for the purpose of adding weight to the pipe to more firmly anchor it on the bottom. However, with the pipe clamp of this invention weight may be conveniently added without disturbing the pipe in any way, and by only one simple tightening operation.

The embodiment 2-A shown in Figs. 4 and 5 may be employed to apply the necessary weight to a pipe seated on a truck or on the ground, and then the same clamp, by means of sling 26 may be used to lift the pipe off the truck and then lower to its in-place position. This procedure eliminates the need for a separate hoisting clamp where a weight clamp is required.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention as defined in the appended claim.

Having thus described the invention, what is claimed as new and useful is desired to be secured by Letters Patent is:

A weight clamp for installation on a pipe, comprising a pair of jaws of substantial length longitudinally with said pipe and of substantial weight and having a curved inner surface corresponding to the outer circumference of said pipe, the upper ends of said jaws being closely adjacent, brackets upstanding from the outer surfaces of said jaws, a curved rigid strap extending between said brackets and connected thereto in pivotal relation, there being a recess on the underside of said jaws adjacent their upper ends, said strap being provided with a vertical hole above the upper ends of said jaws, a bolt passing through said hole, a nut engaging said bolt above said strap, a toggle head on said bolt adapted to pass through the space between the adjacent upper ends of said jaws and engage said recess whereby tightening of said nut will cause said jaws to bind against said pipe with continuous circular contact between said jaws and pipe.

References Cited in the file of this patent

UNITED STATES PATENTS

| | | |
|---|---|---|
| 545,775 | Clark | Sept. 3, 1895 |
| 597,668 | Davison | Jan. 18, 1898 |
| 1,045,804 | Bacon | Dec. 3, 1912 |
| 1,761,497 | Smith | June 3, 1930 |
| 2,245,977 | Houk | June 17, 1941 |

FOREIGN PATENTS

| | | |
|---|---|---|
| 20,076 | Great Britain | 1891 |
| 200,634 | Great Britain | 1923 |
| 314,404 | Italy | 1934 |
| 341,365 | Italy | 1936 |